(12) United States Patent
Aristovich et al.

(10) Patent No.: US 6,365,006 B1
(45) Date of Patent: Apr. 2, 2002

(54) METHOD FOR DISTILLING A MIXTURE OF SUBSTANCES AND DEVICE FOR REALIZING THE SAME

(75) Inventors: Valery J. Aristovich; Jury V. Aristovich; Andrey J. Sokolov; Elena V. Sokolova, all of Sankt-Petersburg (RU)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/269,646

(22) PCT Filed: Oct. 1, 1997

(86) PCT No.: PCT/RU97/00315

§ 371 Date: May 27, 1999

§ 102(e) Date: May 27, 1999

(87) PCT Pub. No.: WO98/15332

PCT Pub. Date: Apr. 16, 1998

(51) Int. Cl.[7] ................................................. B01D 3/14
(52) U.S. Cl. ..................... 203/98; 196/111; 202/153; 202/158; 202/182; 202/197; 203/40; 203/78; 203/100; 203/DIG. 9; 261/148
(58) Field of Search .................................. 202/158, 179, 202/161, 153, 197, 182, 155, 237; 203/87, 98, 100, 40, DIG. 9, 78, 80, 94, DIG. 19; 196/111; 159/901; 261/146–148

(56) References Cited

U.S. PATENT DOCUMENTS 4,025,398 A * 5/1977 Haselden .................... 202/154
4,036,865 A * 7/1977 Hurtmann et al. ............ 230/78
4,234,391 A * 11/1980 Seader ........................ 203/100
4,662,995 A * 5/1987 Lipkin et al. .................. 203/98
4,783,242 A   11/1988 Robbins ........................ 203/87
5,296,103 A * 3/1994 Masetto ....................... 159/47.1

FOREIGN PATENT DOCUMENTS

| RU | 1777921 | 11/1992 |
| RU | 2016617 | 7/1994 |
| RU | 2050167 | 12/1995 |

* cited by examiner

*Primary Examiner*—Virginia Manoharan

(57) ABSTRACT

The present invention pertains to the alcohol processing industry and relates to a method that includes feeding a mixture into a distillation column which is fitted with contact devices for discharging the vapors through the top of said column. This method further includes boiling a bottom product and supplying the vapor thus formed back into the column. A part of the vapor to be processed using one of said contact devices is then fed back into the vapor flow or liquid flow towards one at least of said devices located upstream relative to the flow direction. In another or the same embodiment, a part of the vapor is fed back into the liquid flow under the level thereof and towards the same contact device in a place that is located upstream from its discharge relative to the flow direction of said vapor. The vapor feedback is preformed without complete condensation thereof. The device for realizing this method includes a distillation column that includes contact devices, wherein one at least of said devices is fitted with one or more systems for feeding the processed vapor. This system is located below the vapor collector in the displacement direction of the main flow. This distillation column is further fitted with a transport system for the vapor to be fed therein.

10 Claims, 3 Drawing Sheets

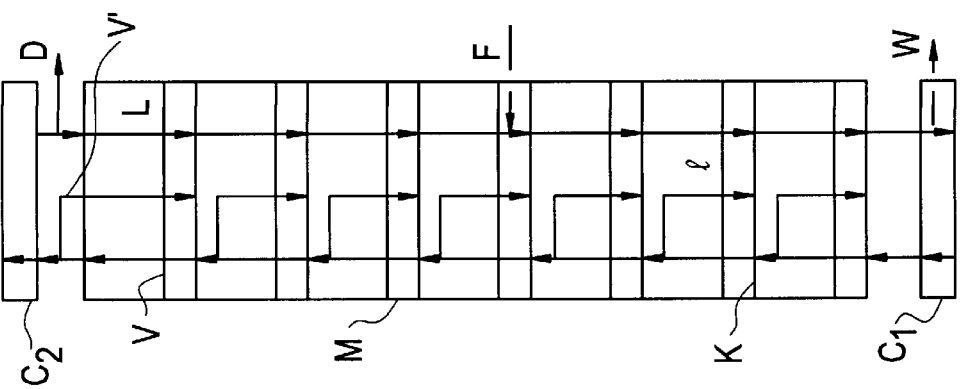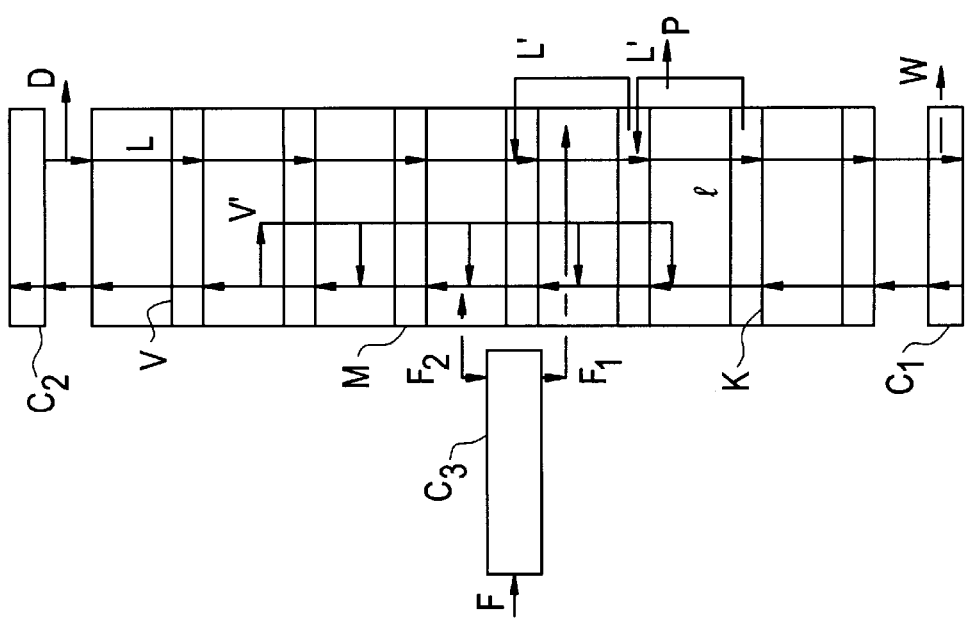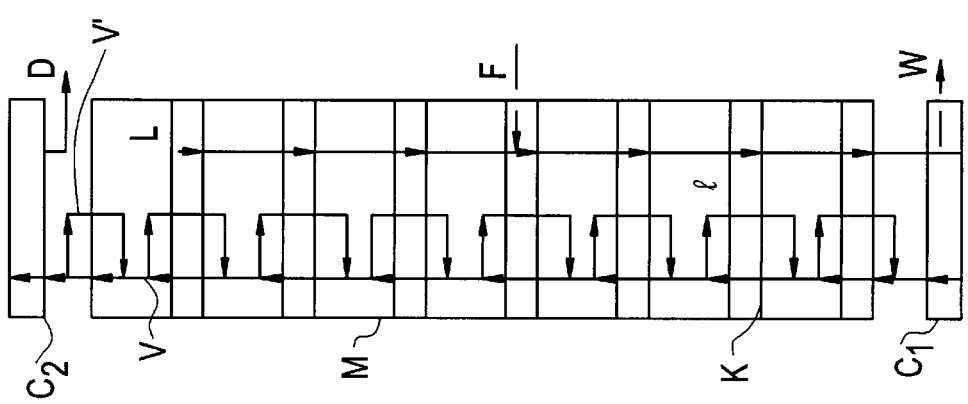

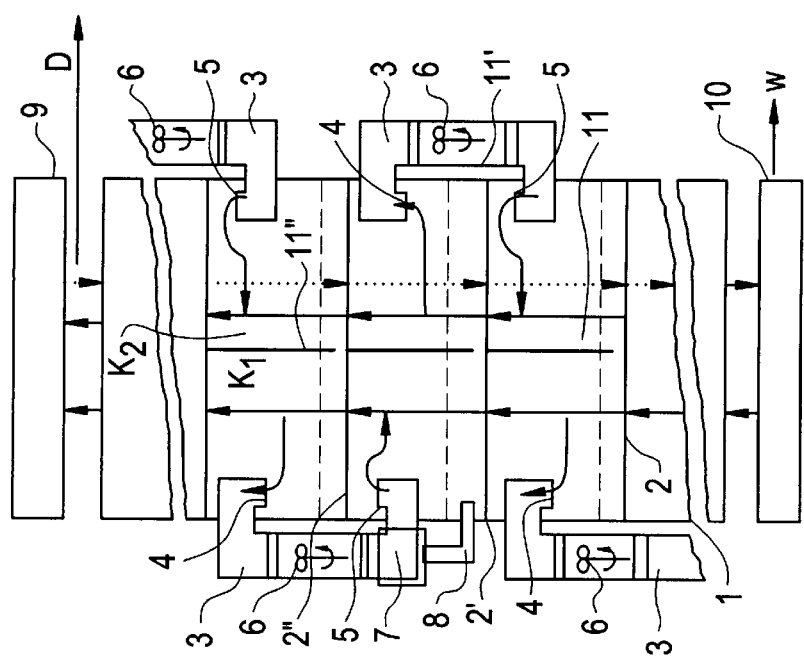
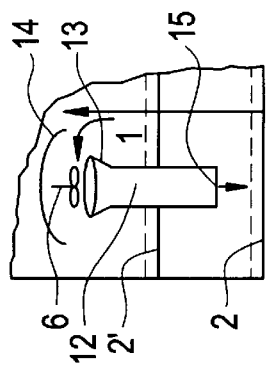
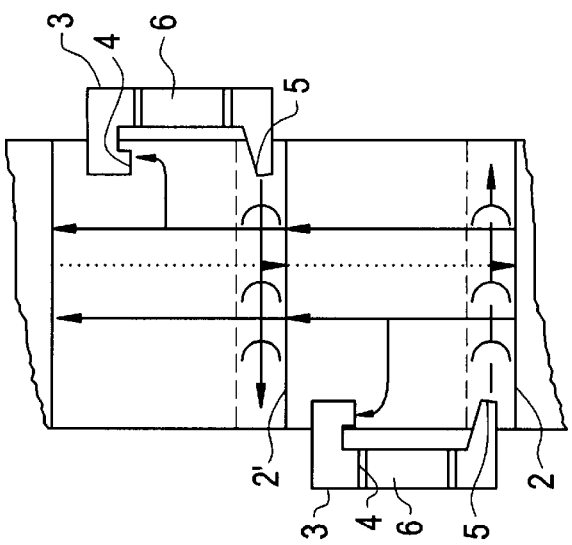

METHOD FOR DISTILLING A MIXTURE OF SUBSTANCES AND DEVICE FOR REALIZING THE SAME

AREA OF TECHNOLOGY

The invention relates to the field of distillation of mixtures of substances in the liquid or liquefied state, for example in the alcohol industry for purifiying alcohol from admixtures, for preparation of purified liquids in microbiology, medicine, agriculture, in processing liquid wastes and effluent, and also in petrochemistry, etc.

STATE OF THE ART

In industrial columns the distillation process takes place in special contact devices, for example of the plate type, packing type, or film type, in which the mass exchange takes place of the substances being separated, i.e. the interaction between the phases of steam and boiling liquid which coexist in them. The initial mixture of substances is heated and delivered as a feed mixture into one of the contact devices of the distillation apparatus. Vapors rise upward through the apparatus, and the liquid flows down into its lower part.

As the vapors pass through these contact devices in sequence, they become enriched in volatile substances and depleted in the ones that are heavy (in volatility), and the liquid does the reverse. In connection with this it is necessary to organize two fundamental processes. First, the successive (as a rule, counter current vertically) movement of the necessary quantity of flows, and second to ensure effective mass exchange of substances in the contact devices. If the phases coexisting in the contact devices are in contact long enough, the maximum possible enrichment and depletion of substances occurs, which is characterized as "thermodynamic phase equilibrium", and equality is established of the chemical potentials of the substances in the vapor and liquid. Under practical conditions the contact time of the coexisting phases is limited, and therefore the flows leaving the contact devices differ from the equilibrium flows. The use of most actual contact devices especially limits how long the vapor phase stays, which is determined by the surfacing time of vapor bubbles. Therefore, single contact of the phases coexisting in the contact devices does not provide an adequate degree of mass transfer. To increase the contact time of the phases, returns (recycles) are made of the streams of liquid and vapor leaving the contact devices, which prolongs he mass exchange between the phases. The refining section of the column, located above the feed input, has a recycle performed of part of the condensate of the vapors leaving the contact device which is uppermost along their course, and delivers this part of the condensate back into the uppermost contact device in the form of reflux liquid which is enriched in volatile substances. The column's stripping section, located below the feed, has vapors of liquid which has left the contact device which is bottommost along its course returned into this same part of the column. So, countercurrent movement of the streams of liquid and vapor occurs in the apparatus.

Thus, the indicated recycling of vapor and liquid solves the problem of increasing to the maximum extent the contact time of the liquid and vapor phase coexisting in the contact device, which provides effective mass exchange between the substances in the contact device.

The stripping section is intended to isolate the bottoms, which are enriched in heavy substances and vapors enriched in the latter, which are returned with evaporation of part of the bottom liquid.

Passing successively through the contact devices, the vapors become depleted in heavy substances and enriched in light ones. Thus, at the top of the refining section part of the product is recycled which is enriched in light substances, and at the bottom of the stripping section part of the product is recycled which is enriched in heavy substances. Mass exchange of substances between phases takes place through two parallel processes—partial evaporation of liquid and partial condensation of vapors.

The path of movement of the liquid is much longer than the path of movement of the vapor. In connection with this it is necessary to increase the time which the vapors spend in the contact devices, which is usually accomplished by reevaporating the reflux liquid (liquid which appears in all contact devices).

The quantity of the flows of vapor and liquid necessary for countercurrent movement is defined by the ratio of volatile and heavy components in the initial mixture and the technical conditions of separation of the distillation products.

In certain methods the initial feed mixture is heated up in a heat exchanger to the boiling point (usually a few degrees lower), and the heated liquid is fed onto the top plate of the stripping section.

The necessary quantity of liquid in the refining section corresponds to the quantity of reflux liquid which is fed onto its top plate, and in the stripping section the feed liquid is added to this. The processes of mass exchange of phases take place adiabatically, which is also dictated by the conditions of thermodynamic phase equilibrium. The quantity of vapor in both sections is practically constant (the small reduction in it is connected with a deviation from adiabaticity, and in the stripping section it is connected with the feed not being adequately heated). The constancy of liquid and vapor flows in the column sections limits the search for their optimal recycles in the individual contact devices, since it becomes necessary to establish the greatest value of recycle caused by the more complex mass exchange conditions in at least one of all the section's contact devices.

Thus, the top contact device in the section has fed to it the maximum quantity of reflux liquid of all those possible for the sections contact devices, and correspondingly the column's bottom contact device has fed to it the maximum quantity of vapor necessary to reevaporate the volatile substances from the reflux liquid.

Separating one column into several refining and stripping sections by creating additional feed inputs or outputs of additional separation products is known in the state of the art. The top part of each of these sections has fed to it its own constant reflux for all contact devices of each section.

It follows from what has been said above, that the indicated problems in certain methods are solved by a single means: recycling part of the distillation product in the form of reflux liquid and recycling part of the bottoms in the form of vapor.

The inadequacy of known methods is the great energy consumption of distillation connected with the phase transformations of the substances being separated when they make the transition from liquid to vapor and vice versa, and the necessity of organizing the indicated recycles: reflux liquid of the top product and vapors of the bottom product of the distillation process in quantities defined by its greatest value from among all the contact devices of the column section.

Moreover, the strict connection of the sections with streams of vapor and liquid overloads the stripping section with liquid and the refining section with vapor. This leads to additional expenditures for preparing equipment and complicates control of the process.

A method and a system are known for distilling volatile substances from an aqueous medium in a column equipped with contact devices (U.S. Pat. No. 4,783,242, B01D, 1988).

Liquid leaving the bottom contact device is directed to a separator. The separator is connected with a thermocompressor which has heating vapor fed into it. The reduction in pressure in the separator produced by the thermocompression of the heating vapor causes the liquid to evaporate. The vapors formed, which are enriched in volatile components, are united in the thermocompressor with the heating vapor and returned to the bottom contact device. The remaining liquid is divided into two parts. One part is directed to the condenser and, after being warmed by vapors which are leaving the top contact device, are returned to the separator, i.e. this liquid is used as a cooling agent in the condenser, utilizing the heat of evaporation. The other part of the liquid, which represents purified water, is removed from the separator in the form of bottom product.

Thus, the heavy components are recycled to the bottom contact device and part of the heat is saved due to thermocompression on their recycling in the form of vapors.

The inadequacy of this method is the use of the generally accepted system of organiing recycles of the main streams in the column: in the form of feeding the usual quantity of reflux liquid to the top contact device, and in the form of feeding the usual quantity of vapors to the bottom contact device, using a standard phase diagram of the streams leaving the devices which are last along their course in the column, which expends more energy.

The method which is closest to the one being proposed is the method of organizing flows in mass exchange apparatus used to separate liquids in the chemical, oil refining, and food industries (patent of the Russian Federation no. 2016617, B01D 3/00, 1994).

The indicated method involves countercurrent contact of vapor and liquid in the contact devices. One of the parts of the vapor stream is sent through a bypass around one or several contact devices, after which it is mixed with the main stream along the course of movement of the vapor stream. The process of separating and mixing streams is performed several times along the height of the apparatus. Such procedures usually make it possible to reduce the vapor overload on the column by regulating the necessary flows of vapors in the direction of movement of the basic flow and electing optimal cross section of the column sections.

Accomplishing the indicated method requires a large quantity of energy. This is connected with the fact that recycling vapor which is directed to various mass exchange devices along its course requires returning the reflux liquid in the usual quantities, and then evaporating it to remove the volatile components.

A device is also known for accomplishing mass exchange equipped with contact devices of any known type (SU, Inventor's Certificate 1777921, B01D 3/22, 1992).

To intensify the heat exchange process in the contact device, the stream of gas is separated into parts with subsequent contact with the entire stream of liquid in the contact device, which is equipped with cross-over connections through which the smaller quantity of vapor passes. The indicated connections are made in pairs by a chamber with a slit-like nozzle ensuring greater contact of liquid and vapor in the contact device.

Although the design of the contact devices does increase the intensity of the process of heat exchange, it does not substantially reduce energy expenditure, since it also requires that the usual quantity of reflux liquid be returned into the column and reevaporated.

DISCLOSURE OF THE INVENTION

This application claims priority to WO 98/15332 filed on Oct. 10, 1996, having International Application No. PCT/RU97/00315 filed on Oct. 1, 1997. The goal of the invention is to create a distillation method and a device for accomplishing it, which operates with the least possible expenditure of energy. Moreover, the accomplishment of the invention makes it possible to reduce the dimensions of the device by selecting optimal cross sections of various column sections, creating optimal flows of liquid and vapor in them.

The method of distilling a mixture of substances comprises feeding the mixture into a distillation column equipped with contact devices for the interaction of liquid and vapor. Vapors of highly volatile substances are removed from the top of the column and the high-boiling substances are boiled in the vat and the vapor which forms is directed to the bottom of the column. In the process, part of the vapor removed from one of the contact devices is returned to the vapor stream or to the stream of liquid in at least one of the contact devices which is upstream from the direction of movement of the basic stream of vapor, and/or part of the vapor is returned to the stream of liquid below its level in the same contact device at a place upstream from its removal, relative to the direction of movement of the basic stream of vapor. The return of part of the vapor into the column is done without it completely condensing, i.e. without its complete phase transformation into liquid.

It is advantageous if the quantity of vapor returned to the nth contact device $V'$ relative to the total quantity in the nth contact device $V_n$ is 0.30–0.95. The indicated ratio is a magnitude obtained by experiment and depends on the difference between the temperature of the liquid in contact device n and the temperature of the vapor in equilibrium with the liquid in contact device n.

Vapor leaving the contact device or at least part of it, returned to the contact devices which are upstream from it relative to the direction of its movement, undergoes partial condensation, and the condensate can be returned to the contact devices which are upstream from the direction of movement of the vapor.

In some cases the initial mixture is boiled in a boiler before it is fed into the distillation column and the streams of vapor and liquid are introduced into the column separately.

Part of the liquid leaving a contact device can be returned to the contact devices upstream from the direction of its movement.

In the proposed invention the problem of creating the necessary quantity of counterbalancing flows of liquid and vapor is solved autonomously for each contact device, independently of the problem of ensuring the intensity of mass exchange in other contact devices. To solve this problem and ensure the necessary separation by repeated contacts of the coexisting phases, the proposed invention uses recycles, i.e. returns of streams of liquids and vapor without significant phase transformations of the substances composing them, and the return of reflux liquid is reduced, which solves the indicated problem with the minimum expenditure of energy.

The temperature of the vapor which is in equilibrium with the liquid in the contact device is established from tabular data on equilibrium (Kogan, V. B., V. M. Fridman, and V. V.

Kafarov. 1966. *Ravnovesie mezhdu zhidkost'iu i parom* (equilibrium between liquid and vapor). Moscow-Leningrad: Nauka).

The vapor temperature in the contact device is measured using known means while the column is in operation.

In the case of wide-boiling mixtures or other cases when the temperature of vapor returned to a contact device is substantially lower than the boiling point of the liquid, it is heated up to the boiling point of the liquid.

Organizing the stream recycles in the contact devices without changing their states of aggregation does not involve significant energy expenditures. This energy is evaluated as the mechanical work to transfer the corresponding streams of vapor or liquid.

Thus, the total expenditure of energy in the proposed method is substantially less than the expenditure of heat to boil the additional reflux liquid, which is created in usual methods.

Moreover, the proposed method makes it possible to regulate any stream recycle ratio in any cross section of the column, i.e. to create the maximum recycle ratio in distillation areas with the most complex conditions and minimal recycle ratio in simple distillation areas. In some methods the recycles of reflux liquid and vapors are constant along the entire height of the column section and, as a rule, are defined by the most complex distillation conditions of any contact device in the section.

Partial condensation of vapor leaving the contact devices is performed by the method commonly accepted in rectification, for example using a refrigeration device, but, at the same time, returning vapor enriched in the substance being isolated causes more efficient mass exchange in the contact device into which the returned vapor is fed.

Condensation of vapor can also be carried out in special devices in which the optimal degree of condensation is regulated.

The partial condensation of the returned vapor makes it unnecessary to use an additional device, since the condensation occurs as a result of the drop in pressure directly in the device transporting the vapor.

In a series of cases, to increase the mass exchange of several components of an admixture in the contact device, part of the liquid is returned to the contact device upstream from the direction of its movement.

The invention provides additional capabilities if the initial (feed) mixture is first boiled and the vapor and liquid formed are fed into the column separately. In usual methods, the operation of the column sections is strictly connected by one of the stream introduced into them. Thus, the quantity of vapors in the refining section depends uniquely on and is equal to the quantity of vapors leaving the last plate of the stripping section. The quantity of liquid in the stripping section is uniquely defined as the sum of the feed and the liquid leaving the lower plate of the refining section. This is what makes impossible the autonomous control of the sections'modes of operation. Such autonomy is possible if the vapor, liquid, and feed mixture are fed into the column separately.

The initial mixture is boiled in an additional boiler and the vapor and liquid formed are fed into the contact devices separately.

If an additional boiler is operating, the bottoms reboiler has to provide the vapor necessary to evaporate the equilibrium vapor on the upper contact device of the stripping section, and the additional boiler has to provide the vapor necessary to evaporate the equilibrium feed vapor. Moreover, energy is expended to create the motive force of the process (overcoming the friction in the column, etc.).

Both parts of the vapor are united in the refining section, where the vapor serves as the heat source to remove volatile components.

In certain methods using two separate boilers instead of one does not provide any advantages in heat economy. In the proposed invention, as was pointed out above, their use makes it possible to reduce the proportion of the total of the expended energy connected with phase transformations of the streams. So, the quantity of heavy components in the bottom contact device of the refining section defines the quantity of reflux liquid returned from the condenser, and the quantity of volatile components in the top contact device of the stripping section defines the quantity of heating vapor in the bottoms reboiler.

The device to accomplish the method of distilling a mixture of substances comprises a distillation column equipped with contact devices and means to remove part of the vapor, at least one of the contact devices also being equipped with at least one means to introduce the removed vapor, the means to introduce vapor being located downs from the vapor removal relative to the movement of the main stream. The column is equipped with a device for transporting the indicated vapor.

The means of removing vapor and the means to introduce it into contact devices can be made in the form of short tubes united by a pipe containing the vapor transporting device, ensuring the movement of vapor from the zone of lower pressure to the zone of higher pressure.

The vapor inlet tube can be located in the vapor zone of the contact device or in the layer of liquid below its level in the contact device.

The means of removing vapor and the means of introducing it can be made in the form of a vapor pipe in which the vapor transport device is located in the column which is above the vapor pipe and is intended to remove vapor from the contact device.

The vapor inlet tubes can be located along a tangent to the circumference of the distillation column's cross section.

Contact devices can be equipped with vertical partitions, whose lower part is submerged in the liquid, forming separate chambers which communicate with one another through the liquid in the chamber, the vapor outlet and inlet tubes being located in different chambers formed by the vertical partitions.

After the transport device, a device can be installed for separating vapor from the liquid carried over by it, which is connected by a pipe with the contact device which is upstream from the direction of movement of the vapor.

The return of vapor without its complete condensation is performed by transfer devices (fans, gas blowers, piston or ejector devices, etc.). In some cases, sections of a column or chamber operating at different pressures are used to transport vapor. Part of the vapor is returned from the zone of higher pressure to the zone of lesser pressure. In particular, vapors under greater pressure form in the stripping section due to the part of the vapors of the bottoms which is heated in the additional heater at greater pressure than the remaining part. The part of the vapors of the bottoms under increased pressure is used as a "working gas" (a working body) to return part of the vapors by ejectors from the contact devices of the column's stripping section. The "working gas" used by the ejectors of the lower part of the refining section is the part of the vapors which is heated in an additional heater. The delivery of "working gas" fed into the ejectors is regulated by the proportional relation or the difference in the values of the actual and equilibrium temperatures in the contact devices. The "working gas" used by the ejectors of the refining section is that part of the vapors from the upper contact device of the section which a gas blower sends to several lower contact devices.

The distillation column can be equipped with contact devices of the plate type, packing type, film type, or other types of devices.

The distillation column can also be equipped with packing rings, packed nets, or other types of packing. Between the rings are vapor pipes to carry vapor from the lower rings to the top ones and devices to allow liquid to flow from the top rings to the bottom ones. Part of the vapors leaving the column's top ring and part of the vapors from the vapor pipes between other rings are returned by gas blowers to the places of the rings upstream from its removal relative to the course of the main stream of vapor. The vapor return tubes are located at different levels of the height of the ring, which can have a variable cross section, its top cross section being greater than its bottom cross section. The relationship of the vapors is regulated proportional to the value of the difference between the temperature of the liquid at the level of the return tube and the equilibrium value of this temperature in the contact device.

BRIEF DESCRIPTION OF THE DRAWINGS

FIGS. 1 (a), (b), and (c) schematically depict distillation columns M, equipped with contact devices K with different variants of return of part of vapor streams in accordance with the invention of this patent application. The liquid level 1 in the contact devices is shown by a dotted line.

FIG. 2(a) is an illustration of a distillation column showing the direction of movement of liquid and steam;

FIG. 2(b) is a detailed representation of the distillation column of FIG. 2(a) illustrating the mea for removing and introducing vapor;

FIG. 2(c) is a detailed representation of the distillation column of FIG. 2(a) illustraig another means for removing and introducing vapor;

DESCRIPTION OF THE PREFERRED EMBODIMENTS

Figure 3A:
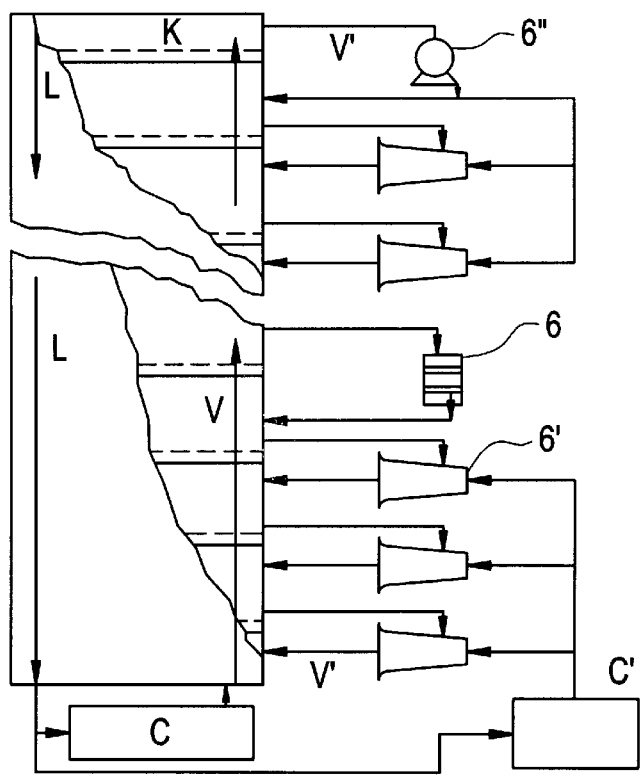
FIG. 3(a) is an illustation of the retun of vapors to the distillation column.

FIG. 1(a) shows one of the variants of organizing the streams of liquid and gas, in which part of the vapor removed from a contact device is returned to areas of contact devices which are upstream from the direction of movement of the vapor.

The initial mixture is fed into column M in the form of feed F. The top of the column is equipped with condenser C2. The main stream of vapor V moving up the column, successively passes through contact devices K, and goes into condenser C2. The vapors condense in the condenser and are removed from the column in the form of distillation product D. Liquid L moves down the column against the current, and goes into the column's vat $C_1$, and the vapors formed in the vat are returned to the bottom contact device. The bottoms W obtained are removed from the column.

In the contact devices mass exchange of substances takes place between the boiling liquid and vapor phases coexisting in them. After the mass exchange process takes place, part of the vapor V' is removed from each contact device and is returned again the direction of its movement to the upstream areas of contact devices, sending it into the vapor stream V, which is above the liquid level 1 in the contact device.

FIG. 1(b) shows a variant of organizing the rams of liquid and vapor in which part of the vapor removed from the contact device is returned to several contact devices upstream from the direction of movement of the main stream of vapor V.

The distillation column M, shown in FIG. 1(b), is also equipped with boiler C3, into which the infeed F is fed and then boiled, and then the streams of liquid F1 and vapor F2 are separately introduced into the column.

The removal of part of the vapor V' and its return to the stream of vapor V is accomplished in several contact devices K upstream from the direction of its movement.

The removal of part of the liquid L' and its return to the main stream L is accomplished in two contact devices, part of the liquid in the contact device being removed in the form of liquid side stream P. FIG. 1(c) shows a variant of organizing the streams in which part of the vapor V' removed from contact device K is fed to the same contact device, but into the stream of liquid L lower than its level 1 in the device.

FIG. 2(a) schematically depicts a device for accomplishing the distillation process and shows the direction of movement in the column of the streams of vapor V (the solid line) and liquid L (dotted line), and also the direction of movement of the removed and introduced stream of vapor into the contact devices.

The device comprises a distillation column 1, equipped with contact devices 2, 2', 2" of the plate type. The means for removing the vapor and its introduction to the contact devices are made in the form of tubes 4 and 5. Pipe 3 connects the vapor outlet 4 with its inlet tube 5. The vapor transporting device 6 is made in the form of a fan located in the pipe 3. Separator 7 for separating vapor from the liquid formed is behind fan 6 and is connected by pipe 8 with contact device 2'.

At the top, column 1 is equipped with a reflux condenser 9, and at the bottom with vat 10. The contact devices are equipped with partitions 11, the lower parts of which are beneath the level of the liquid, indicated by a dotted line. The partitions form chambers K1 and K2, which communicate with one another through the liquid, the vapor outlets 4 and vapor inlets 5 being located in different chambers of the same contact device.

FIG. 2 (b) schematically depicts a fragment of the column with contact devices 2 and 2'. The means of removing and introducing vapor are made in the form of a vapor pipe 12, whose input part 13 is cone-shaped and is located in the vapor zone of contact device 2', and the 15 of vapor 12 is located in the vapor zone of contact device 2, which is upstream from the direction of the main stream of vapor V. The vapor transport device 6 is located in front of the input part 13 of vapor pipe 12 and is equipped with a deflector 14 separating the stream of removed vapor from its main stream.

FIG. 2(c) schematically depicts a fragment of the column with contact devices 2 and 2'. The means of removing vapor and the means of introducing it are made in the form of tubes 4 and 5 connected by pipe 3, which contains the vapor transport device 6. The vapor inlet 5 is nozzle-shaped to improve the mass exchange process.

Tubes 4 and 5 are located in the same contact device, the vapor inlets 5 being located below the level of the liquid layer in the contact device.

FIG. 2(a) shows that the initial mixture of substances F is fed into the top plate of the stripping section. The stream of liquid L moves down column 1, and the stream of vapor V goes up column 1 against the stream. In the contact devices 2, 2', and 2", mass exchange of substances occurs between the phases of boiling liquid and vapor coexisting in them. The dotted line shows the level of the liquid layer 1 in the contact device.

The liquid leaving the bottom plate of the stripping section goes into the vat 10. The vapors forming in the vat are returned to the lower plate of the stripping section. Vapors, successively passing through the plates, go into the reflux condenser 9. The vapors are condensed in the reflux condenser 9 and are removed from the column in the form of distillation product D, and the bottoms W are removed from the column's vat 10.

Thus, streams are organized of the minimum necessary quantities of vapor and liquid, not connected with phase transformations and necessary to remove volatile substances from the refining section and heavy substances from the stripping section.

Aside from the minimum necessary streams of vapor and liquid additional recycles of vapors and liquid are organized in the contact devices.

Part of the vapor from contact device 2" is removed through tube 4 with the help of fan 6, located in pipe 3, and it is sent through pipe 3 and introduced through tube 5 into contact device 2', which is upstream from the direction of the main stream of vapor V, i.e. located below contact device 2".

Separator 7 separates from the vapor the liquid which forms, which is sent though pipe 8 to contact device 2, which is upstream from the direction of the main stream of vapor V. FIG. 2(b) shows that fan 6 helps direct part of the stream of vapor from the vapor zone of contact device 2' into vapor pipe 12 through its cone-shaped input part 13. Deflector 14 serves as an auxiliary means to separate the removed stream of vapor from its main stream. The stream of vapor removed through the outlet part 15 of vapor pipe 12 is introduced into the vapor zone of contact device 2.

FIG. 2(c) shows that part of the stream of vapor is removed through tube 4 and introduced into the same contact device below the level of the liquid layer 1, through nozzle-shaped tube 5.

FIG. 3(a) shows that part of the vapor stream V' is returned by ejectors 6' and 6" to the contact devices K which are upstream from the direction of the movement of the vapor. The "working gas" used in the ejectors is vapor forming in the additional heaters C and C', which operate under increased pressure.

The "working gas" used in the ejectors of the upper part of the refining section is the part of the vapor of the upper contact device which is fed into the ejectors by gas blower 6". In some contact devices vapors are returned by fans 6.

Figure 3B:
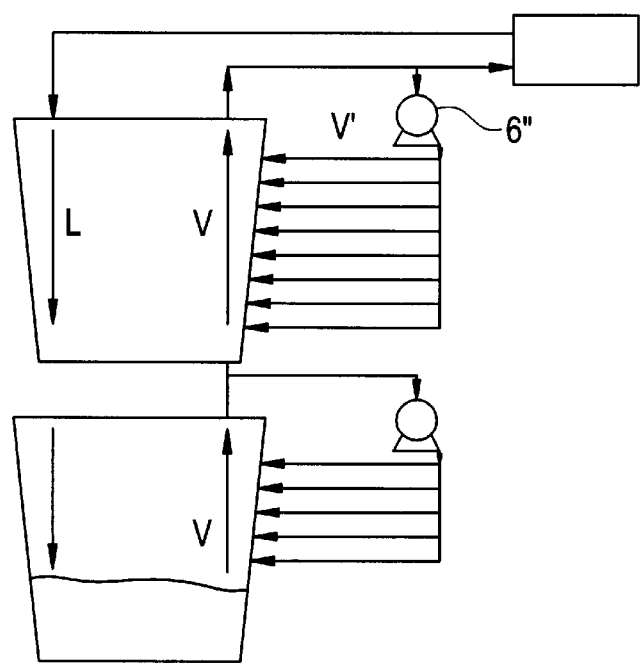
FIG. 3(b) is another illustration of th return of vapors to the distillation column.

FIG. 3(b) schematically depicts a fragment of the device in which the return of vapors by gas blower 6" is made between sections of the packing column M into places of the section having different heights.

Additional recycles ensure high intensity of mass exchange of substances between the phases coexisting on the plates due to the contact ratio, which ensures that the vapors leaving the plate are enriched to the necessary degree in the volatile components and depleted in the heavy ones, and the reverse processes in the liquid leaving the plate.

VARIANT EMBODIMENTS OF THE INVENTION

EXAMPLE 1

A water-alcohol mixture, containing 8 mass % of alcohol, is separated in a distillation apparatus. The apparatus is equipped with a column, a condenser, and a boiler. The column is equipped with 70 bubble-cap plates on which mass exchange occurs of boiling liquid and the vapor bubbling through it. The column operates at atmospheric pressure. The condenser has alcohol vapors fed into it which are leaving the top plate along their course. The condensate obtained is separated into two streams, one of which is removed in the form of a light fraction of distillation product, containing alcohol and light admixtures. The remaining part of the condensate is returned in the form of reflux liquid to the top plate. A distillation product is removed from the 68th plate (from the bottom) in the form of liquid distillation product containing more than 94 mass % alcohol.

Before being fed into the column, the initial mixture is fed into an additional boiler and the vapor formed is sent to the 20th plate, and the remaining liquid is fed to the 19th plate. The liquid leaving the first plate is introduced into the boiler, and the vapor formed is returned to the column to the first plate, and the remaining liquid contaning water and less than 0.02% alcohol, is removed in the form of bottoms. Above the 1st plate, the column has a means for removing vapor and introducing the removed part of it to the contact devices, which are made in the form of short tubes connected by pipes, which have fans installed in them. The vapor inlets, as is shown in FIG. 2(a) are located beneath the outlets. The part of the vapor which leaves plates 60 through 68 is sent by a fan into the vapor zone of plates 59 through 67. The ratio between the part of the vapor V' being returned and its total quantity $V_n$ in contact devices 60–68 is 0.9–0.95. In the same way, vapor is returned from plates 1 through 59 to the ones below with a $V'/V_N$ ratio of 0.8–0.85.

Part of the liquid from plates 12, 14, and 18 is removed by pumps and sent to plates 13, 15, and 19, respectively, with a fisel fraction being removed from plates 12 and 14 in the form of a side stream.

If the method is organized in the indicated manner, the distillation product will contain more than 94% alcohol, and the bottoms will contain water and less than 0.02% alcohol.

The saving of the heating vapor is greater than 25% compared with the usual method.

EXAMPLE 2

A water-alcohol mixture, containing 8 mass % of alcohol according to Example 1, is fed into a distillation column equipped with 70 valve plates.

Part of the vapors leaving plate 69 and part of the vapors leaving plate 70 (the ratio of the part of vapor removed V' to the total quantity $V_n$ in the indicated plates is 0.9–0.95), are returned by fans into the liquid through short tubes located on a tangent to the distillation column's circumference. A gas blower feeds part of the vapors leaving plate 68 in a $V'/V_N$ ratio equal to 0.8–0.85 as working gas to ejectors installed on plates 67 through 42, where they are mixed with vapors leaving these plates, as is shown in FIG. 3(a). From the ejectors the mixture of vapors is returned into the vapor space of the plates. In an analogous manner, vapors from the 42nd through 19th plate are returned from the ejectors, where the working gas used is vapor leaving plate 42. In ejectors of the 1st through 18th plate, part of the vapors leaving the plates is mixed with vapors of part of the bottoms, which is boiled in an additional vat at a pressure of 1.6 atm.

The distillation product contains more than 94% alcohol, and the bottoms contain less than 0.01%. The saving of the heating vapor is more than 20% compared with the usual method.

EXAMPLE 3

A liquified gaseous admixture is fed into a distillation apparatus, which is a column equipped with 25 plates of the downcomerless tray type for mass exchange of boiling liquid with vapor. The mixture consists of the following substances: 5% methane. 35% ethane, 15% propylene, 20% propane, 10% iso-butane, and 15% n-butane. At the top of the column a pressure of 27 atm. is maintained. The apparatus is equipped with a condenser to which are fed the vapors leaving the top mass exchange device along their course (the plate of the downcomerless tray type). The condensate obtained is separated into two streams, one of which is removed in the fonn of distillation product, and the other in the form of reflux liquid is fed to the top plate.

From the bottom plate of the column the liquid leaving the last plate along its course is sent to a boiler, where part of the liquid is evaporated. The vapors formed are returned to the column to the last plate, and the remaining liquid is removed in the form of bottoms.

Fan devices are arranged between all plates, making it possible to return part of the vapors leaving the plates to the plates upstream from the direction of movement of the main stream of vapor. The ratio between the removed part of the vapor V' and the total quantity of vapor $V_T$ on plates 1 through 5 and 20 through 25 (counting from the bottom) is 0.9–0.95, and in column plates 5 through 20 it is 0.8–0.85.

The distillation product contains methane and ethane and less than 5% of other, heavier substances, and the bottoms contain less than 5% methane and ethane and represent the remaining, heavier (with regard to boiling) substances of the initial mixture.

The total consumption of energy carriers (heating vapor and cooling agent) is 30% less than with common rectification.

EXAMPLE 4

A liquified gaseous mixture is separated in an analogous manner to example 3 on a column equipped with 30 valve plates. The return of part of the vapors from plates 16 through 30 is accomplished by fan devices installed on each plate. Plates 1 through 15 have part of the vapors leaving the plates returned through ejectors, see FIG. 3(*a*). In the ejectors the "working gas" used is part of the vapors of the bottoms. In the vat a pressure of 25 atm. is maintained. The distillation and bottom products obtained correspond to the products obtained in Example 3. The total consumption of energy carriers is approximately 25% less than with common rectification.

EXAMPLE 5

Water which has been polluted with gases of chemical production and which contains up to 0.05% of ammonia, hydrogen sulfide, and other harmful gases, is fed into a column equipped with 40 valve plates. The column consists of shells, each of which contains 8 plates, and between them are placed ejector devices, see FIG. 3(*b*). Part of the vapors leaving each plate of the shell, except the top one, is returned by an ejector to this plate. Part of the vapors from the top plates of the shell are returned to them by gas blowers, and another part of the vapors of the top plates are fed into ejectors of the lower plates as "working gas". In the column's vat purified water is produced containing less than 10 ppm of harmful gases. In the top part of the column a fortified fraction of harmful gases is obtained, which is sent for reprocessing. The column's vat has heating vapor fed into it, whose saving is greater than 25% compared with the common method.

INDUSTRIAL APPLICABILITY

Thus, as can be seen from the description and the examples cited, the method of distillation and the device to accomplish it ensure that final products are obtained with a reduction in energy expenditures of at least 20%, and, moreover, the dimensions of the distillation column can be reduced because the cross section of individual sections in the middle part of the column is reduced due to the autonomous regulation of recycles in individual contact devices.

Additional recycles ensure high intensity of mass exchange of substances between the phases coexisting in the contact devices due to a contact ratio which ensures that the vapors leaving the contact devices are enriched to the necessary extent in volatile components and depleted in the heavy ones, and the reverse processes in the liquid leaving the contact devices.

For each contact device a recycle of vapor is created autonomously which is opposite to the direction of movement of its main flow, and this increases the contact time of the vapor and liquid, intensifies mass exchange, and allows reducing to a minimum the repeated evaporation and return of reflux liquid into the distillation column.

Using the developed method significantly reduces the expenditure of energy, and the system of autonomous operation of each of the contact devices allows reducing the column's dimensions.

What is claimed is:

1. A method of distilling a mixture of substances comprising feeding the mixture into a distillation column equipped with a plurality of contact devices for interaction of liquid and vapor, wherein the bottom of the column is heated to form a vapor from the mixture, and a portion of the vapor is removed from a plurality of positions in the column and recirculated back into the column in a position upstream with respect to the direction of vapor flow, wherein the vapor is not completely condensed prior to recirculation.

2. The method according to claim 1, wherein the portion of vapor is removed from a first contact device and is returned to a second contact device wherein the second contact device is in a position upstream of the first contact device with respect to the direction of vapor flow.

3. The method according to claim 1, wherein the portion of the vapor is removed from above a first contact device and is returned into a stream of liquid below a vapor removal level, wherein the stream of liquid is also above the first contact device.

4. The method according to claim 1, wherein the mixture is first boiled in a boiler, thereby producing streams of vapor and liquid which are separately fed into the distillation column.

5. A device for distilling a mixture of substances, which device, comprises
   a distillation column having a plurality of contact devices for interaction of liquid and vapor; and
   a plurality of recirculation means, each recirculating means recirculating the vapor from a position in the column to a position upstream with respect to the flow of the vapor within the column.

6. The device according to claim 5, wherein the recirculation means are short tubes which comprise vapor transport means to ensure the movement of vapor from a zone of lower pressure into a zone of higher pressure.

7. The device according to claim 6, wherein the recirculation means comprises a vapor pipe and a transport means located in the distillation column.

8. The device according to claims 5, wherein the recirculation means comprises vapor inlets located on a tangent to the circumference of the distillation column's cross section.

9. The device according to claims 5, wherein the contact devices have vertical partitions whose lower parts are submerged in the liquid thereby forming separate chambers which communicate through the liquid, wherein the vapor outlets and vapor inlets in the contact device are located in different chambers formed by the vertical partitions.

10. The device according to claim 5, which further comprises a separation means to separate the vapor from the liquid formed, wherein the separation means unites the recirculation means with at least one contact device.

* * * * *